Patented May 17, 1938

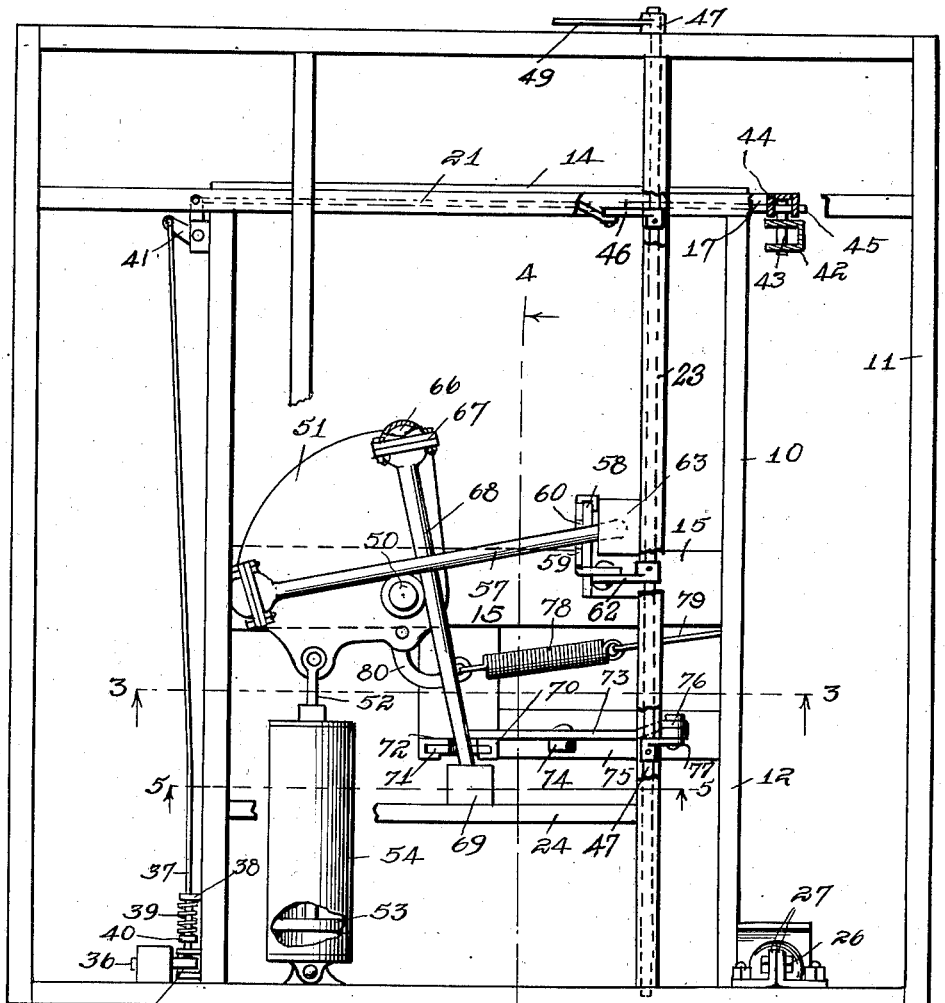

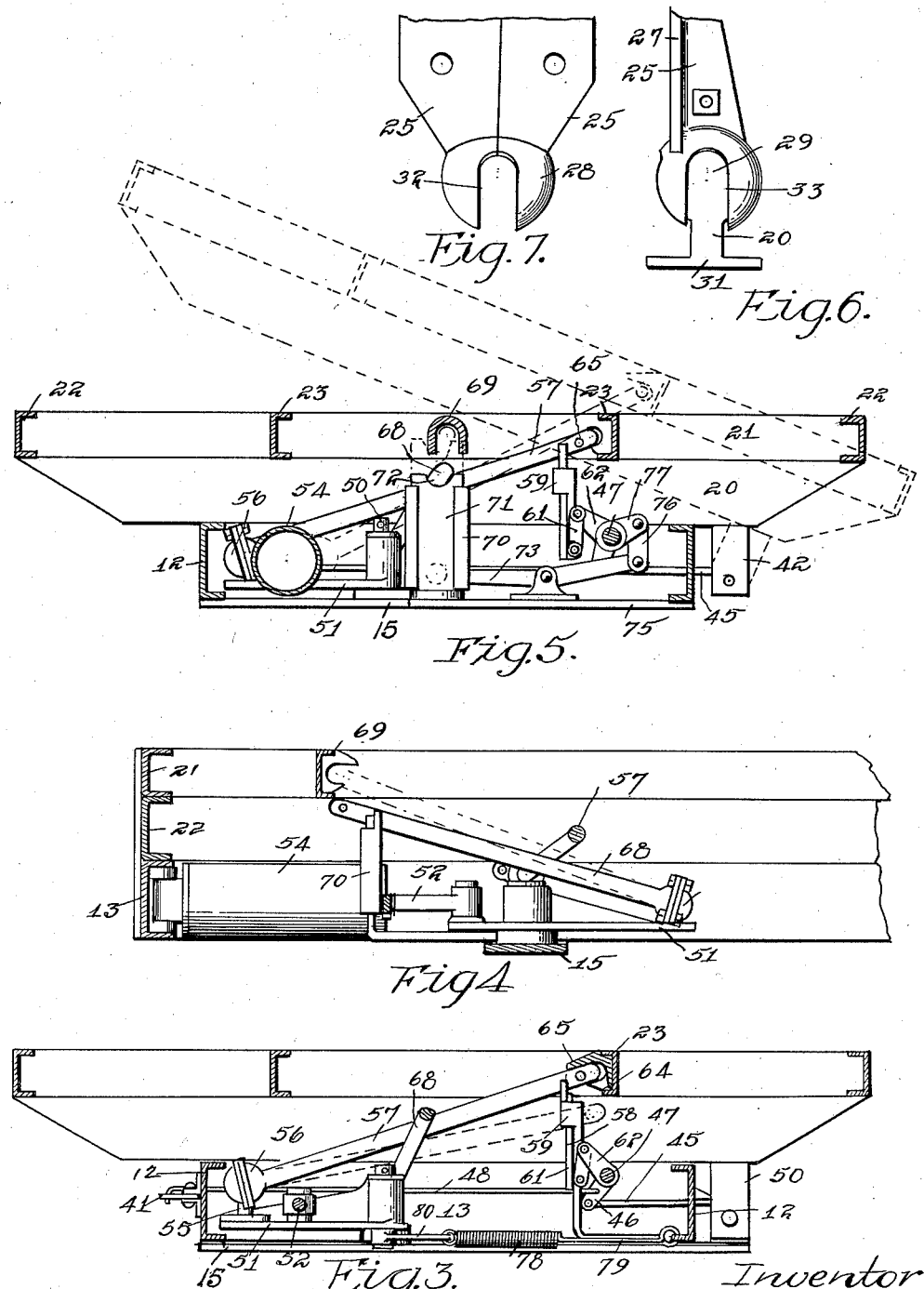

2,117,568

UNITED STATES PATENT OFFICE 2,117,568

DUMP BODY FOR AUTO TRUCKS

Vincent R. Myers, Red Oak, Iowa

Application January 4, 1936, Serial No. 57,531

10 Claims. (Cl. 298—22)

This invention relates to improvements in dump bodies for auto trucks of that type wherein the body may be dumped either to the rear or to one side of the body by means of a single lifting mechanism operated either mechanically or manually.

More specifically, it is the object of my invention to provide in a dump body of the type above referred to employing a main frame for supporting a hydraulic mechanism and a dump frame pivoted thereto, means for supporting any desired type of body having a main frame designed to support the hydraulic lifting mechanism entirely within said frame and between its upper and lower surfaces whereby the main frame may be easily and quickly attached to any one of the various devices of commercial truck frames without alteration and without interference between the truck parts and said hydraulic lifting mechanism.

A further object of my invention is to provide improved means for pivoting the dump frame to the main frame whereby the dump frame may be dumped over to one side or towards its rear end at the will of the operator.

A further object of my invention is to provide an improved mechanism for elevating and lowering the dump frame.

A further object is to provide in a dump frame adapted to be moved to dumping position either laterally or rearwardly, improved means for pivoting the dump frame to the main frame, and in connection therewith improved means for locking the pivot member utilized in the dumping operation.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved dumping mechanism for auto trucks;

Figure 2 is a rear end elevation of the same;

Figure 3 is a detail sectional view taken on the line 3—3 of Figure 1;

Figure 4 is a detail sectional view taken on the line 4—4 of Figure 1;

Figure 5 is a detail sectional view taken on the line 5—5 of Figure 1;

Figure 6 is an enlarged detail end elevation of the universal pivot member; and

Figure 7 is a side elevation of the upper portion of said pivot member.

The main frame is indicated generally by the numeral 10, while the dump frame is indicated generally by the numeral 11. The main frame comprises a pair of parallel forwardly and rearwardly extending channel bars 12, a rear end member 13 and a front member 14. This frame also includes a centrally located cross plate 15. In the actual construction of both the main frame and the dump frame a number of braces is necessary and provided. However, for the sake of simplicity the braces are omitted inasmuch as they form no part of my invention.

The rear right hand corner of the frame 10 is provided with a pivot supporting bracket 16, while the front end of the right hand frame member 12 is provided with a pivot supporting bracket 17. The left hand end of the member 13 is provided with a pair of lugs 18 having their lower ends connected by means of a plate 19 so as to provide a pivot socket. The bracket 16 and the members 17 and 19 are located in a plane near the bottom edge of the frame member 10 for reasons hereinafter made clear.

The dump frame 11 comprises a pair of transversely arranged end members 20 designed to support end members 21, the end members 21 being secured to the ends of forwardly and rearwardly extending channel irons 22 and 23, the channels 22 forming the side edges of the frame, while the channels 23 serve as floor supports for the body carried by the frame 11. These members 23 also serve to support the cross frame member 24 near the rear end of the frame 11.

Fixed to the rear members 20 and 21 are two vertically arranged plates 25 secured together by means of bolts 26 extending through flanges 27, the plates 25 being either riveted or welded to the said frame members 20 and 21, and having the lower ends extending below the lower edge of the frame member 20 and terminating in a socket portion 28 designed to be supported by a ball 29 mounted on the upper end of a suitable pedestal 30, which in turn is carried by a base plate 31, the plate 31 being supported on the bracket 16 in the manner clearly illustrated in Figures 1, 2, and 6. The socket member 28 is provided with a slot 32 in its rear face and a slot 33 in its outer side face, the slot 32 being designed to permit the entrance of the pedestal 30 as the frame member 11 is tilted rearwardly, while the said pedestal 30 will enter the slot 33 as the frame 11 is tilted laterally, thus providing means whereby the rear right hand corner of the dump frame 11, as viewed in Figure 1, will be permanently pivoted to the main frame 10.

The left hand end of the members 20 and 21 are provided with a pivot plate 34 having a downwardly extending end 35 in which a pivot pin 36 is mounted designed to enter between the plates 18 and to rest on the plate 19 as the frame 11 is tilted rearwardly, the pin 36 being locked in position between the lugs 18 by means of a locking rod 37 extending slidably through lugs 38 formed on the outside surface of the left hand member 12, said rod being adapted to move to position above the pin 36 as illustrated in Figure 2, and when so locked, to lock the pivot pin 36 against lifting out of the socket formed by the members 18. A spring 39 is provided on the rod 37, having one end acting against the forward lug 38 and the other end against a collar 40 carried by the rod 37 for yieldably moving the rod 37 into locking position. The forward end of the rod 37 is pivoted to the bell crank lever 41 carried by the forward end of the left hand frame member 12.

The forward right hand end of the frame member 11 is provided with a downwardly extending bracket 42 having a horizontally and forwardly extending pin 43 designed to enter between vertically arranged lugs 44 carried by the bracket 17 to form a socket for receiving the pin 43. The pin 43 and the ball 29 serve to act as pivot members for the frame 11 when the said frame is tilted laterally or to one side. A locking rod 45 is provided for locking the pin 43 in operative position, the right hand end of said rod 45 being connected to a rock arm 46 secured to a rock shaft 47 mounted in the end members 13. The bell crank lever 41 is connected to one end of a rod 48 mounted parallel with the front member 13, the opposite end of the rod 48 being connected to the rock arm 46 whereby the rod 45 may be moved to unlocking position simultaneously with the movement of the rod 37 to locking position, or vice versa, by simply oscillating the shaft 47. The forward end of the shaft 47 is provided with a lever 49 for manually providing said rocking movement. By this arrangement it will be seen that I have provided means by which the dump frame member 11 may be tilted either rearwardly or laterally, and have also provided means for locking either of the pivot pins 36 or 43 in operative position and at the same time release the other pin.

For moving the dumping frame to operative position I have provided the following mechanism. Supported on the bar 15 is an upright pivot 50 designed to support what I shall term a sector 51 adapted to swing in a horizontal plane, said sector being actuated by means of a piston rod 52 operated by a piston 53 within the hydraulic cylinder 54. It will readily be seen that as the piston 53 is moved outwardly the sector 51 will be rotated in a clockwise direction, as viewed in Figure 1. The sector 51 is provided with a ball supporting pedestal 55, designed to carry a ball socket 56, to which is attached one end of a push bar 57 supported normally in an upwardly and transversely inclined position with its upper end carried by an upright support 58, in a position as illustrated in dotted lines in Figure 3, with its upper end slightly below the frame member 23. Slidably mounted on the upright 58 is a slide bar 59, having a notch 60 for receiving the free end of the push bar 57, the lower end of the member 59 being pivotally connected to a link 61, the upper end of said link being pivotally connected to a rock arm 62 fixed to the shaft 47 in such a manner that as the shaft 47 is rocked in a clockwise direction, as illustrated in Figure 3, the free end of the push bar 57 will be elevated into a socket plate 63 fixed to the frame member 23, said socket plate being provided with a pair of inwardly extending hook members 64 spaced apart far enough to permit the free end of the bar 57 to move upwardly between them, the bar 57 being provided with laterally extending pins 65 designed to be engaged by said hook members 64 as the frame member 11 is moved to tilted position, and to prevent the free end of the push bar from dropping out of the socket 63 in case the free edge of the frame 11 should be thrown upwardly accidentally or in case said frame should be tilted by other means than the said push rod.

It will readily be seen that if the sector 51 was rotated in a clockwise direction longitudinal movement would be imparted to the bar 57 causing its free end to enter the socket 63 and tilting movement to be imparted to the frame member 11. In this connection it should be borne in mind that the pivot members 29 and 43 are located a considerable distance below the frame 21 so that the contact surfaces of the member 57 and the socket 63 lie in a plane extending through said pivot members, said plane being substantially at 45° from the horizontal, so that a considerable amount of effective swinging pressure will be applied to the dumping frame even when the push bar 57 assumes a position so near the horizontal.

The sector 51 is also provided with a pivot ball 66 having a socket 67 supporting a rearwardly extending bar 68 having its free end engaging a socket member 69 similar to the socket member 63. The free end of the member 68 is carried by a slide plate 70 mounted on an upright support 71, the upper end of the slide plate 70 having a notch 72 for receiving the bar 68, the lower end of the plate 70 being pivotally connected to one end of a lever 73, said lever being mounted on a fulcrum 74 carried by a cross bar 75. The opposite end of the bar 73 is connected to the lower end of an upright link 76, the upper end of which is pivotally connected to a rock arm 77 carried by the rock shaft 47. It will readily be seen that as the rock shaft 47 is rocked in a clockwise direction, as illustrated in Figure 5, the plate 70 will be elevated, causing the free end of the bar 68 to be lifted into the socket 69. At the same time the free end of the bar 57 will be lowered out of engagement with the socket 63. Rotation of the sector 51 in a clockwise direction will cause the bar 68 to be moved rearwardly, and in turn the frame 11 to be tilted rearwardly. Inasmuch as the locking rods 37 and 45 are operatively connected with the rock shaft 47 it will be seen that the rod 45 will be withdrawn from engagement with the pin 43 at the time the bar 57 is lowered and the bar 68 elevated. At the same time the rod 37 will move into locking position, thereby providing means for automatically locking the operating pivot pin in operative position.

After the frame 11 has been moved to dumping position and the pressure against the piston 53 has been released, the weight of the frame 11 will cause the sector 21 to be rotated in an anti-clockwise direction, and the piston 53 will be returned to nearly its inoperative position. To insure the complete return of the piston 53 I have provided a spring 78, having one end connected to a rod 79, which is in turn connected to the frame member 12, and the other end connected to a curved bar 80, one end of which is pivotally connected to the sector 51 in such a manner that the spring will cause the piston 53 to be returned to its complete normal position, and the ends of the push bars 57 and 68 to be withdrawn from the sockets 63 and 69, the bar 80 being curved to permit its pivotal connection to swing around the pivot 50 to or past the dead center position.

Thus it will be seen I have provided a dump frame comprising a supporting frame which may be secured to the top surface of an auto truck, with the lifting mechanism supported by the main frame and between its upper and lower surfaces, whereby the lifting mechanism will not interfere with the differential housing, brake mechanism or any other mechanism carried by the truck frame, the dump frame being pivotally connected to the main frame so as to swing in either one of two dumping positions. One corner of the dump frame is permanently pivoted to the main frame to prevent accidental disconnection between the two frame members and to provide simplified pivot arrangement between the two frame members. A further advantage is to provide improved linkage and leverage mechanism between the hydraulic cylinder and the dump frame, wherein the maximum amount of leverage may be imparted to the load as the dumping frame is moved from a horizontal position to an inclined position, said leverage decreasing as the frame moves to an inclined position, at which time the load is decreased as the dump frame approaches a vertical plane. In other words, the maximum amount of power is applied at the time when the load is the heaviest. It will be seen that this link mechanism may be manufactured as a unit and easily and quickly applied to any ordinary type of auto truck. Any form of body or box may be easily and quickly applied to the dump frame.

I claim as my invention:

1. The combination of a supporting frame; a dump frame; means for mounting the dump frame to the supporting frame to permit the dump frame to be moved to either lateral or rearwardly inclined position; means supported by the supporting frame to elevate the dump frame to either of its inclined dumping positions, said means comprising a pair of upwardly and outwardly inclined push bars supported substantially at right angles to each other; means supporting the lower ends of said push bar to swing in horizontal arcuate paths; means for selectively moving the upper end of either push bar into and out of engagement with said dump frame; and means for imparting movement to the last means.

2. The combination of a supporting frame; a dump frame supported thereon; means for universally pivoting one corner of said dump frame to the corresponding corner of the supporting frame; means for detachably and pivotally connecting the opposite ends of the side and end members of the drump frame to which the universal pivoting member is connected, to the corresponding corner of the supporting frame; means for locking either of the last said pivoting means whereby the dump frame may be tilted either laterally or rearwardly to inclined dumping position; power operated means for elevating the dump frame to either of said dumping positions, said means comprising a pair of upwardly and outwardly inclined push bars supported substantially at right angles to each other; means supporting the lower ends of said push bars to swing in horizontal arcuate paths; means for selectively moving the upper end of either push bar into and out of engagement with said dump frame; means for imparting movement to the last means; and means for simultaneously operating one of said push bar selecting means and a corresponding locking means.

3. The combination of a supporting frame; a dump frame; means for mounting the dump frame to the supporting frame to permit the dump frame to be moved to either lateral or rearwardly inclined positions; means supported within the supporting frame to move the dumping frame to either of its inclined dumping positions, said means comprising a pair of upwardly and outwardly inclined push bars supported substantially at right angles to each other, a horizontal sector mounted on a vertical pivot and pivotally supporting the lower ends of said push bars, vertically arranged slide plates for supporting the free ends of said push bars normally out of engagement with said dump frame; and actuated means for selectively elevating said slide plate into engagement with a corresponding push bar to move said push bar into operative relation with said dump frame.

4. The combination of a supporting frame; a dump frame; pivot members for mounting the dump frame to the supporting frame to permit the dump frame to be moved to either lateral or rearwardly inclined positions; means supported within the supporting frame to move the dumping frame to either of its inclined dumping positions, said means comprising a pair of upwardly and outwardly inclined push bars supported substantially at right angles to each other, a horizontal sector mounted on a vertical pivot and pivotally supporting the lower ends of said push bars, vertically arranged slide plates for supporting the free ends of said push bars normally out of engagement with said dump frame; hand actuated means for selectively elevating said slide plate into engagement with a corresponding push bar to move said push bar into operative relation with said dump frame; and means also actuated by said hand actuated means for locking one of said pivot members into pivotal relation to said supporting frame and simultaneously unlocking the other pivot member.

5. The combination of a supporting frame; a dump frame; means for pivotally connecting the dump frame to the supporting frame to swing from a horizontal position to position inclined to said horizontal position; means imparting tilting movement to said dump frame, including an upwardly inclined push bar; means attached to the lower end of said push bar for imparting longitudinal movement thereto; a socket carried by said dump frame for detachably receiving the free end of said push bar; means for moving the free end of said push bar into and out of engagement with said socket; and means for locking the free end of said push bar within said socket after the dump frame has been moved to a slightly inclined position to prevent movement of the socket from said push bar.

6. The combination of a supporting frame; a dump frame; means for mounting the dump frame to the supporting frame to permit the dump frame to be moved to either lateral or rearwardly inclined position; means supported by the supporting frame to elevate the dump frame to either of its inclined dumping positions, said means comprising a pair of upwardly and outwardly inclined push bars supported substantially at right angles to each other; means supporting the lower ends of said push bar to swing in horizontal arcuate paths; and means for operatively connecting and disconnecting the upper end of either of said push bars to said frame member.

7. The combination of a supporting frame, a dump frame, means for pivotally mounting the dump frame on the supporting frame to swing from a horizontal position to an inclined position, a push bar for elevating the free end of said dump frame, means carried by said dump frame for connecting the free end of said push bar to said dump frame, means for moving said push bar longitudinally to elevate said dump frame, means for moving said connecting means and push bar in operative relation to each other, and means for automatically locking the push bar to said connecting means by a relative movement between the connecting means and said push bar as the dump bar is elevated.

8. The combination of a supporting frame, a dump frame, a set of pivot members for mounting the dump frame to swing upwardly and laterally to an inclined dumping position, a set of pivot members for mounting the dump frame to swing upwardly and rearwardly to a second inclined dumping position, means carried by the supporting frame to move the dumping frame to either of its inclined dumping positions, said means including a pair of upwardly and outwardly inclined push bars supported substantially at right angles to each other, means for moving said push bars longitudinally, means for supporting the free ends of said push bars normally out of engagement with said dump frame, hand actuated means for selectively elevating the free ends of said push bars into operative relation with said dump frame, and simultaneously actuated means for locking one set of pivot members into operative connection with the supporting frame and simultaneously unlocking the other set of pivot members.

9. The combination of a supporting frame, a dump frame, pivot members for mounting the dump frame to the supporting frame to permit the dump frame to be moved to either lateral or rearwardly inclined positions, means supported within the supporting frame to move the dumping frame to either of its inclined dumping positions, said means comprising a pair of upwardly and outwardly inclined push bars supported substantially at right angles to each other, a horizontal sector mounted on a vertical pivot and pivotally supporting the lower ends of said push bars, power operated means for oscillating said horizontal sector to impart longitudinal movement to said push bars, and means for selectively moving either of said push bars into operative relation with said dump frame.

10. The combination of a supporting frame; a dump frame, pivot members for mounting the dump frame to the supporting frame to permit the dump frame to be moved to either lateral or rearwardly inclined positions, means supported within the supporting frame to move the dumping frame to either of its inclined dumping positions, said means comprising a pair of upwardly and outwardly inclined push bars supported substantially at right angles to each other, a horizontal sector mounted on a vertical pivot and pivotally supporting the lower ends of said push bars, a fluid operated piston, a piston rod therefor having its free end pivotally connected to said sector to oscillate said sector as the rod is moved longitudinally, and means for selectively moving the free end of either of said push bars into operative relation with said dump frame.

VINCENT R. MYERS.